(12) United States Patent
Radun et al.

(10) Patent No.: US 10,822,116 B2
(45) Date of Patent: Nov. 3, 2020

(54) POWER DISTRIBUTION NETWORK

(71) Applicant: GE AVIATION SYSTEMS LLC, Grand Rapids, MI (US)

(72) Inventors: Arthur Vorwerk Radun, Mason, OH (US); Manish Ashvinkumar Dalal, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 834 days.

(21) Appl. No.: 15/597,882

(22) Filed: May 17, 2017

(65) Prior Publication Data

US 2018/0337531 A1 Nov. 22, 2018

(51) Int. Cl.
| | |
|---|---|
| *B64D 47/00* | (2006.01) |
| *H02J 1/00* | (2006.01) |
| *H02K 11/04* | (2016.01) |
| *H02K 7/18* | (2006.01) |
| *H02M 7/04* | (2006.01) |
| *H02J 1/10* | (2006.01) |
| *H02M 1/00* | (2006.01) |
| *H02J 1/08* | (2006.01) |

(52) U.S. Cl.
CPC .............. *B64D 47/00* (2013.01); *H02J 1/102* (2013.01); *H02M 7/04* (2013.01); *B64D 2221/00* (2013.01); *H02J 1/082* (2020.01); *H02M 2001/0077* (2013.01)

(58) Field of Classification Search
CPC ....... B64D 47/00; B64D 2221/00; H02J 1/00; H02M 7/04; H02M 2001/0077
USPC .................................................. 307/9.1, 10.1
See application file for complete search history.

(56) References Cited

U.S. PATENT DOCUMENTS

| | | | |
|---|---|---|---|
| 7,970,497 B2 | 6/2011 | Derouineau et al. | |
| 9,484,749 B2 | 11/2016 | Brombach et al. | |
| 2003/0025398 A1* | 2/2003 | Nakamura | H02M 7/49 307/72 |
| 2018/0287391 A1* | 10/2018 | Shibata | H02H 3/16 |

* cited by examiner

*Primary Examiner* — Rexford N Barnie
*Assistant Examiner* — Toan T Vu
(74) *Attorney, Agent, or Firm* — McGarry Bair, P.C.

(57) ABSTRACT

A power distribution system, includes a first current loop connected with a set of low voltage electrical loads, a second current loop connected with a set of high voltage electrical loads, at least two generator systems having respective power outputs, and a controller module configured to selectively connect the respective power outputs to at least one of the first or second current loops.

19 Claims, 6 Drawing Sheets

POWER DISTRIBUTION NETWORK

BACKGROUND OF THE INVENTION

Electrical power systems, such as those found in an aircraft power distribution system, employ power generating systems or power sources, such as generators, for generating electricity for powering the systems and subsystems of the aircraft. As the electricity traverses electrical bus bars to deliver power from power sources to electrical loads, power distribution nodes dispersed throughout the power system ensure the power delivered to the electrical loads meets the designed power criteria for the loads.

BRIEF DESCRIPTION OF THE INVENTION

In one aspect, the present disclosure relates to a power distribution system, including a first generator system adapted to generate a first power, a first set of electrical loads selectively connectable with a first current loop, a second generator system adapted to generate a second power, and a second set of electrical loads selectively connectable with a second current loop. The first generator system is selectively connectable with the first current loop, the second generator system is selectively connectable with the first current loop, and the first and second generator systems are selectively connectable in series with second current loop.

In another aspect, the present disclosure relates to a power distribution system, includes a first current loop connectable with a set of low voltage electrical loads, a second current loop connectable with a set of high voltage electrical loads, at least two generator systems having respective power outputs, and a controller module configurable to selectively connect the respective power outputs to at least one of the first or second current loops. In response to a control signal from the controller module, at least one of the first or second generator systems power outputs is connectable with the first current loop to supply power to the low voltage electrical loads, or the first and second generator system power outputs are connectable in series and are further connectable with the second current loop to supply power to the high voltage electrical loads.

DESCRIPTION OF EMBODIMENTS OF THE INVENTION

Figure 1:
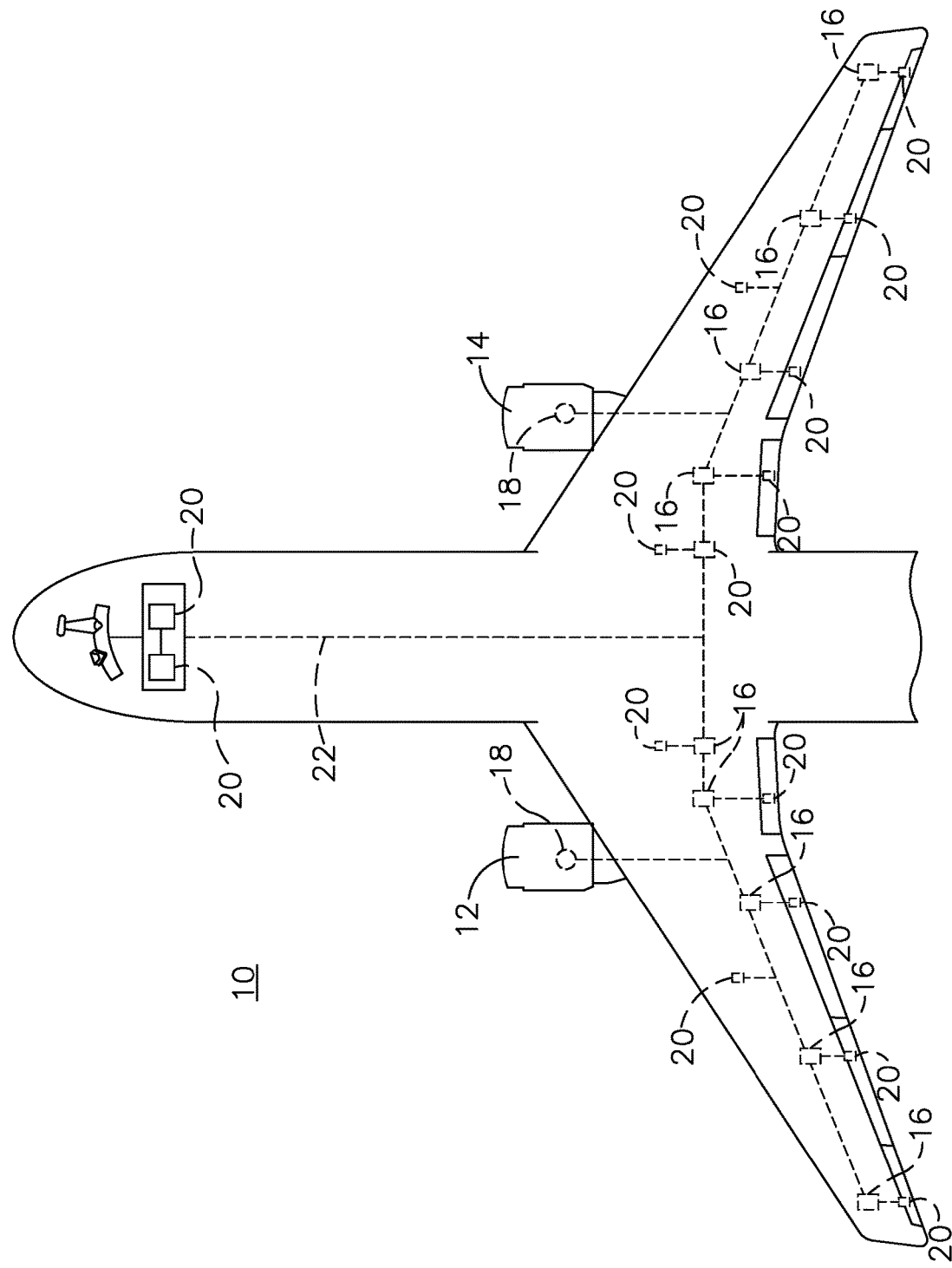
FIG. 1 is a top down schematic view of the aircraft and power distribution system of an aircraft in accordance with various aspects described herein.

The described aspects of the present disclosure are directed to a method and apparatus associated with a power distribution network or system. One example environment where such a method and apparatus can be used includes, but is not limited to, a power distribution system for an aircraft. While this description is primarily directed toward a power distribution system for an aircraft, it is also applicable to any commercial or residential environment using a power distribution system where input power is received, acted upon (if necessary), e.g., converted or modified, and distributed to one or more electrical loads.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

While terms such as "voltage", "current", and "power" can be used herein, it will be evident to one skilled in the art that these terms can be interchangeable when describing aspects of the electrical circuit, or circuit operations. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein.

The exemplary drawings are for purposes of illustration only and the dimensions, positions, order and relative sizes reflected in the drawings attached hereto can vary.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as an electric machine or a generator 18. While only one generator 18 is schematically illustrated, aspects of the disclosure can be included wherein a set of generators are utilized for power generation, for example, at a single engine system 12, 14.

The aircraft is shown further having a set of power-consuming components, or electrical loads 20, such as for instance, an actuator load, flight critical loads, and non-flight critical loads. The electrical loads 20 are electrically coupled with at least one of the generators 18 via a power distribution system including, for instance, power transmission lines 22, conductors, bus bars, or the like, and power distribution nodes 16. It will be understood that the illustrated aspects of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a turbine engine spool, to provide a driving force for the set of generators 18. The set of generators 18, in turn, generate power, such as direct current (DC) power, and provides the generated power to the transmission lines 22, which delivers the power to the power distribution nodes 16, positioned throughout the aircraft 10. The power distribution nodes 16 receive the DC power via the transmission lines 22, and can provide switching, power conversion, or distribution management functions, as needed, in order to provide the desired electrical power to the electrical loads 20 for load operations.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included. Furthermore, additional power sources for providing power to the electrical loads 20, such as emergency power sources, ram air turbine systems, starter/generators, or batteries, can be included, and can substitute for the power source. It will be understood that while one aspect of the disclosure is shown in an aircraft environment, the disclosure is not so limited and has general application to electrical power systems in non-aircraft applications, such as other mobile applications and non-mobile industrial, commercial, and residential applications.

Figure 2:
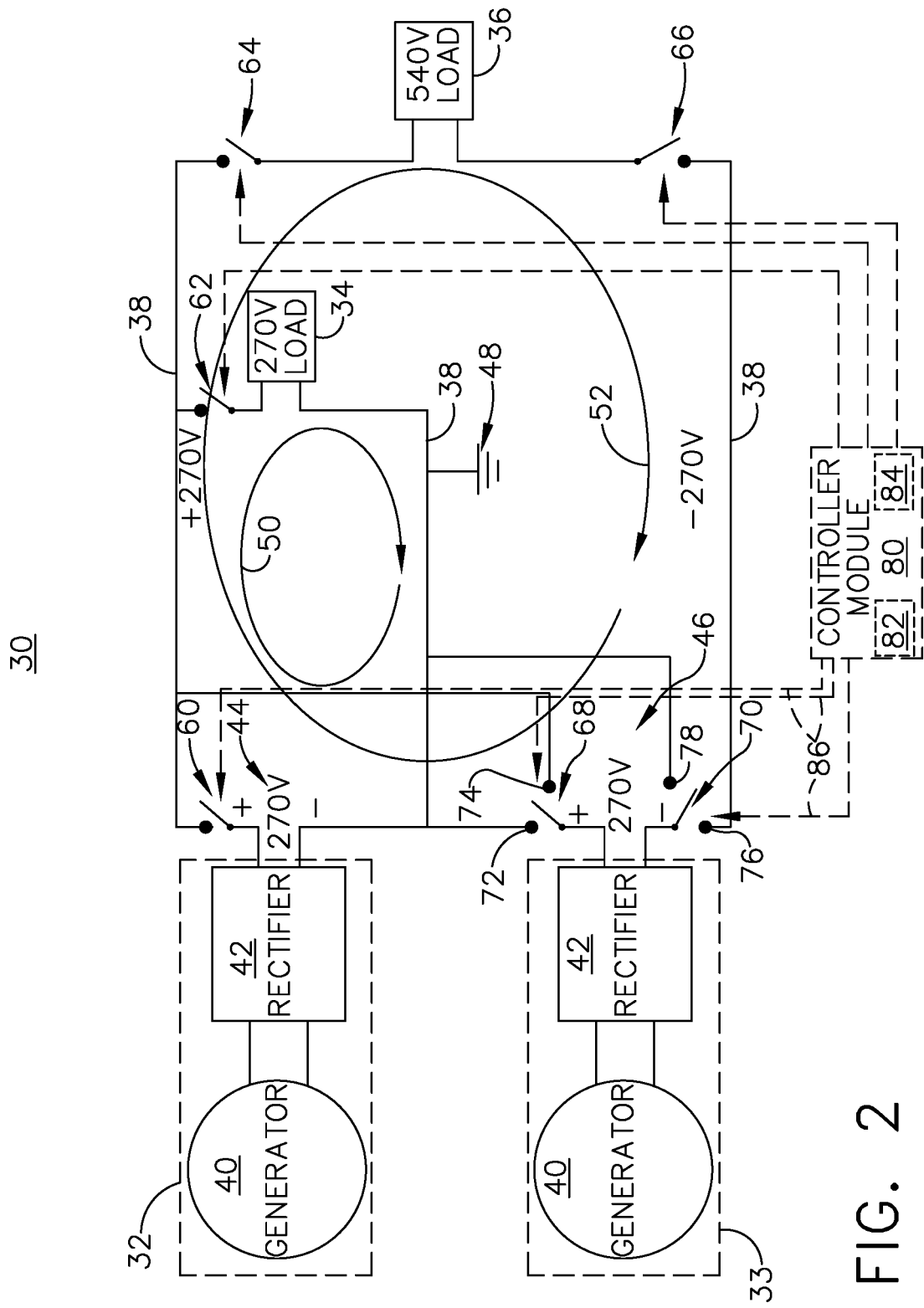
FIG. 2 is a schematic view of a power distribution system in accordance with various aspects described herein.

FIG. 2 illustrates a non-limiting schematic example of a power distribution system 30. As shown, the power distribution system can include a set of power generator systems illustrated as a first generator system 32 and a second generator system 33. The first and second generator systems 32, 33 can be configured, adapted, or the like, to provide corresponding respective DC power outputs.

The first generator system 32 can be selectively connected with a first set of electrical loads, represented by a single first load 34, by way of a set of conductors or power transmission lines 38. The second generator system 33 can also be selectively connected with at least one of the first load 34, a second set of electrical loads, represented by a single second load 36, or a combination thereof, by way of the set of transmission lines 38.

In one non-limiting aspect of the disclosure, the first generator system 32 can include a generator 40 connected with a rectifier 42 adapted to provide or generate a first DC power output 44 and the second generator system 32 can include a generator 40 connected with a rectifier 42 adapted to provide or generate a second DC power output 46. Non-limiting aspects of the disclosure can be included wherein the first generator system 32 can differ from the second generator system 33. Further non-limiting aspects of the disclosure can be included wherein the first generator system 32 is substantially alike the second generator system 33, or provide a substantially similar power output to the second generator system 33, for example, in characteristics including, but not limited to, current, voltage, or power output, or the like.

Non-limiting aspects of the power distribution system 30 can be included wherein the first power output 44 and the second power output 46 can share an electrical ground 48. The electrical ground 48 can be disposed or located in series between the first and second power outputs 44, 46, such that the effective first power output 44 of the first generator system 32 can include a positive power output, a positive voltage power, or the like, relative to the electrical ground 48. In one non-limiting example, the first generator system 32 can generate a first positive power output 44 of 270 Volts DC, relative to electrical ground 48. In another non-limiting example, the second generator system 33 can generate a second effective or operable negative power output 46 of −270 Volts DC, relative to electrical ground 48. The first generator system 32 and the second generator system 33, or the first power output 44 and the second power output 46 can be arranged, connected, disposed, or the like, such that they can be selectively connected in series to provide a cumulative power output of the first and second power outputs 44, 46, such as 540 Volts DC. Additional power supply configurations including, but not limited to, currents, voltages, powers, and the like, are envisioned in aspects of the disclosure.

Aspects of the power distribution system 30 are further configured or arranged such that at least one of the first power output 44, the second power output 46, or a combination thereof, can be selectively connected with the first load 34, for example, by way of a set of switching elements, to define a first current loop 50, effectively or operably powering the first load 34. Additionally, the power distribution system 30 can be further configured or arranged such that at least one of the first power output 44, the second power output 46, or a combination thereof, can be selectively connected with the second load 36, for example, by way of a set of switching elements, to define a second current loop 52, effectively or operably powering the second load 36. Non-limiting aspects of the disclosure can be included wherein at least a portion of the first current loop 50 can define, or overlaps with, at least a portion of the second current loop 52.

In one non-limiting example, the first current loop 50 can include a configuration or arrangement wherein the first power output 44 is selectably connected or connectable with the first load 34 by way of the transmission lines 38. The electrical ground 48 can be serially disposed downstream of the first load 34. The first currently loop 50 can further include a set of switchable elements, for instance including a first switch 60 disposed proximate to the first power output 44, and a second switch 62 disposed proximate to the first load 34. In this sense, the first switch 60 can effectively or operably enable or disable the supplying of power from the first power output 44 to the transmission lines 38. Similarly, the second switch 62 can effectively or operably enable or disable the supplying of power from the transmission lines 38 to the first load 34.

Non-limiting aspects of the disclosure can be included wherein at least one of the first or second switches 60, 62 are single pole switches, that is, the respective switch or switches 60, 62 is configured to only enable and disable a single circuit (i.e. supplying the first power output 44 to the first current loop 50, or receiving of the first current loop 50 to the first load 34). Stated another way, at least one of the first or second switches 60, 62 are configured only to operate in a conductive or closed state, allowing current to conduct across the respective switch 60, 62, or a non-conductive or open state, preventing current from conducting across the respective switch 60, 62.

In another non-limiting aspect of the disclosure, the second current loop 52 can include a configuration or arrangement wherein the second power output 46 is selectably connected or connectable with the second load 36 by way of the transmission lines 38. In this sense, the second current loop 52 can include a third switch 64 disposed upstream of the second load 36 and a fourth switch 66 disposed downstream of the second load 36. As shown, the third switch 64, the fourth switch 66, or a combination thereof, can effectively or operably enable or disable the supplying of power to the second load 36. The respective switch or switches 64, 66 can be configured to only enable and disable a single circuit, such as the second current loop 52.

Non-limiting aspects of power distribution system 30 can also be included wherein the second power output 46 can be controllably provided to at least one of the first current loop 50, the second current loop 52, or a combination thereof, by way of a set of switchable elements. For instance, a fifth switch 68 can be disposed downstream of the second power output 46 and a sixth switch 70 can be disposed upstream of the second power output 46. The fifth switch 68 can further include a first lead 72 connected with the negative terminal of the first power output 44 and a second lead 74 connected in parallel with the positive terminal of the first power output 44 (notwithstanding the above-described first switch 60). The sixth switch 70 can include a third lead 76 connected with the second load 36 (notwithstanding the fourth switch 66) and a fourth lead 78 connected in parallel with the negative terminal of the first power output 44, the electrical ground 48, or a combination thereof. In this sense, the fifth and sixth switches 68, 70 can be multi-pole switches, wherein the respective switch 68, 70 can be connected with a first respective connection lead, a second respective connection lead, no connection at all (e.g. open state).

At least a subset of the aforementioned switches 60-70 can be controllably operated by a controller module 80. Non-limiting examples of the controller module 80 can include, for instance, a processor 82 and memory 84, wherein the processor 82 can be configured to operably execute instructions or programs stored in the memory 84 adapted to operate the switches 60-70. Aspects of the disclosure can be included wherein the controller module 80 can be included as a component of the power distribution system 30, or as part of another system or subsystem of the power network, aircraft, or the like. The controller module 80 can be communicatively connected with the set of switches 60-70 by way of a set of communication connections 86, schematically connected with dotted lines.

The configuration, arrangement, or the like, of the aforementioned switches 60-70 allow for a power distribution system 30 that can be selectably operated to provide for a set of power configurations based on expected operation of the system 30. For instance, in a first non-limiting example, the first and second switches 60, 62 can be closed in response to a control signal from the controller module 80, allowing for the first power output 44 to be supplied to the first load 34 via the first current loop 50. In this sense, the first load 34 can be a set of electrical loads utilizing 270 Volt DC power. In this sense, the first load 34 can include a set of electrical loads utilizing a "low" voltage. In a second non-limiting example, the second switch 62 can be closed, the fifth switch 68 can be connected with the second lead 74, and the sixth switch 70 can be connected with the fourth lead 78, in response to a set of control signals from the controller module 80. In this second non-limiting example, the power distribution system 30 can be selectively enabled, connected, or configured such that the second power output 46 is supplied to the first load 34 via the first current loop 50. The aforementioned second non-limiting example can occur, for example, simultaneously with the first non-limiting example, wherein both power outputs 44, 46 supply power to the first load 34 via the first current loop 50.

In a third non-limiting example, the first switch 60, the third switch 64, and the fourth switch 66 can be closed, the fifth switch 68 can be connected with the first lead 72, and the sixth switch can be connected with the third lead 76, in response to a set of control signals from the controller module 80. In this third non-limiting example, the power distribution system 30 can be selectively enabled, connected, or configured such that the first and second power outputs 44, 46 are connected in series, and provide the series output to the second load 36 via the second current loop 52. In this sense, the second load 36 can be a set of electrical loads utilizing 540 Volt DC power. In this sense, the second load 36 can be a set of electrical loads utilizing a "high" voltage, compared with the first load 34. The aforementioned third non-limiting example can further be utilized or combined with the earlier examples, such as wherein at least one power output 44, 46 supplies power to the first load 34 via the first current loop 50. Any number of permutations of the controllable configuration, enabling, or providing of the power outputs 44, 46 to at least one of the first or second current loops 50, 52 is envisioned.

As described herein, aspects of the disclosure can be included wherein, for example the set of power outputs 44, 46, switches 60-70, or the like, can be included as part of, or a portion of the first current loop 50, the second current loop 52, or a combination thereof, depending or based on the switch configuration and control signals from the controller module 80. For instance, aspects of the power distribution system 30 can be included wherein the first switch 60, when controllably closed, can be at least a portion of the first current loop 50 and the second current loop 52 simultaneously, depending on the overall configuration and operation.

While aspects of the illustrated power distribution system 30 includes a generator 40 and a rectifier 42 in each respective generator system 32, 33, the disclosure envisions generator system 32, 33 configurations wherein the generator 40 can include a starter/generator and the rectifier 42 can include a rectifier/converter, including, but not limited to, a bidirectional inverter. Collectively, the generator systems 32, 33 having the starter/generator configuration can be utilized or enable the starting of the mechanically connected engine in response to receiving a starting power from the power distribution system 30.

Figure 3:
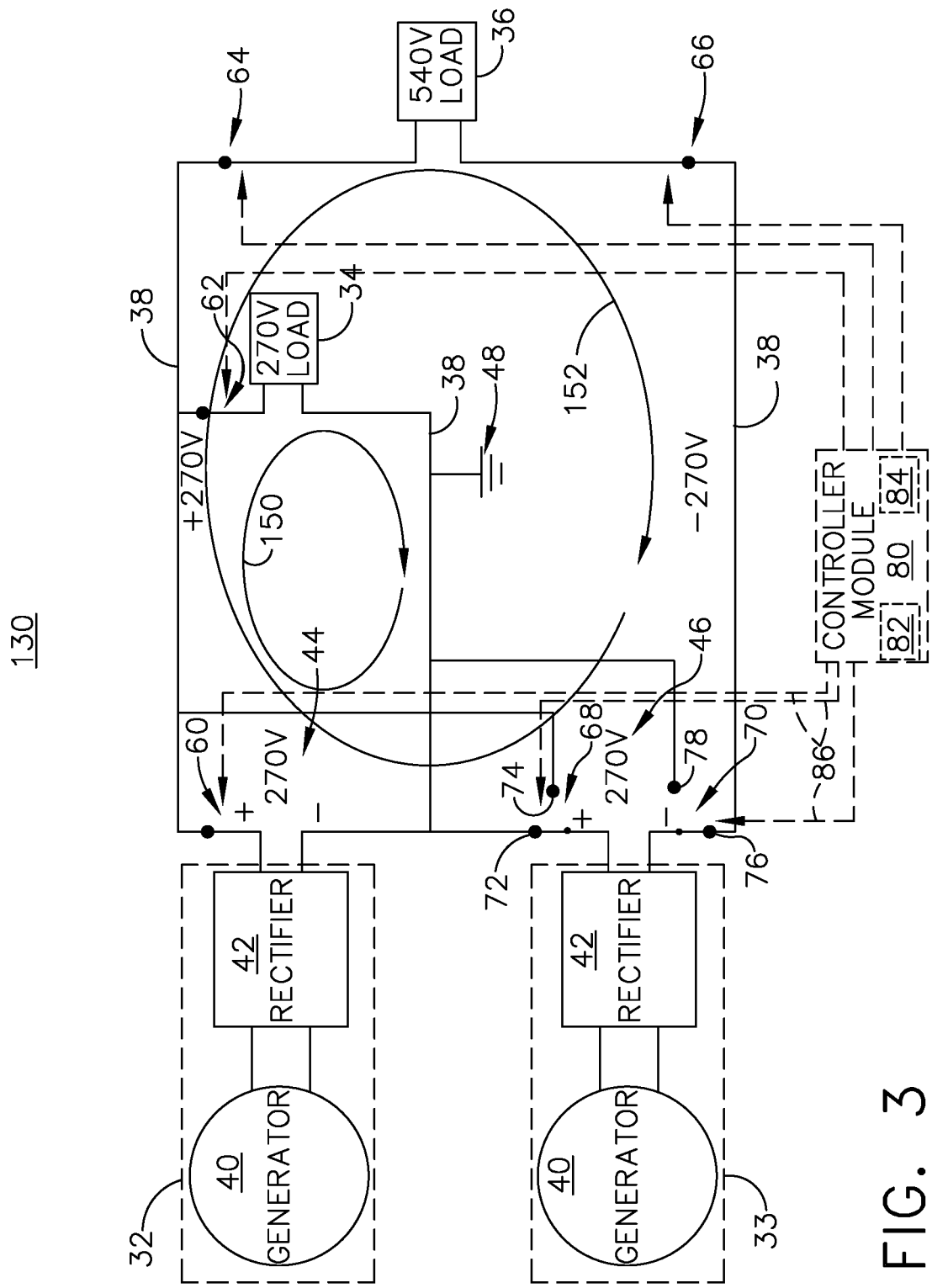
FIG. 3 is a schematic view of a power distribution system of FIG. 2 supplying power to a first current loop and a second current loop, in accordance with various aspects described herein.

FIG. 3 illustrates another configuration or operation of the power distribution system 130 according to another aspect of the present disclosure. The power distribution system 130 is similar to the power distribution system 30; therefore, like parts will be identified with like numerals increased by 100, with it being understood that the description of the like parts of the power distribution system 30 applies to the power distribution system 130, unless otherwise noted. As shown, the power distribution system 130 is controllably operated or configured such that the first switch 60, the second switch 62, the third switch 64, and the fourth switch 66 are closed, and wherein the fifth switch 68 is connected with the first lead 72 and the sixth switch 70 is connected with the third lead 76, in response to a set of control signals from the controller module 80. In this illustrated example, the power distribution system 130 is supplying the set of power outputs 44, 46 to both the first current loop 150 and the second current loop 152 simultaneously. Alternative or additional non-limiting aspects of the operation or configuration illustrated in FIG. 3 can be included wherein, for example, the second switch can be controllably opened such that the first load 34 is not supplied with power. In this example, the first and second power outputs 44, 46 can supply power to only the second load 36.

Figure 4:
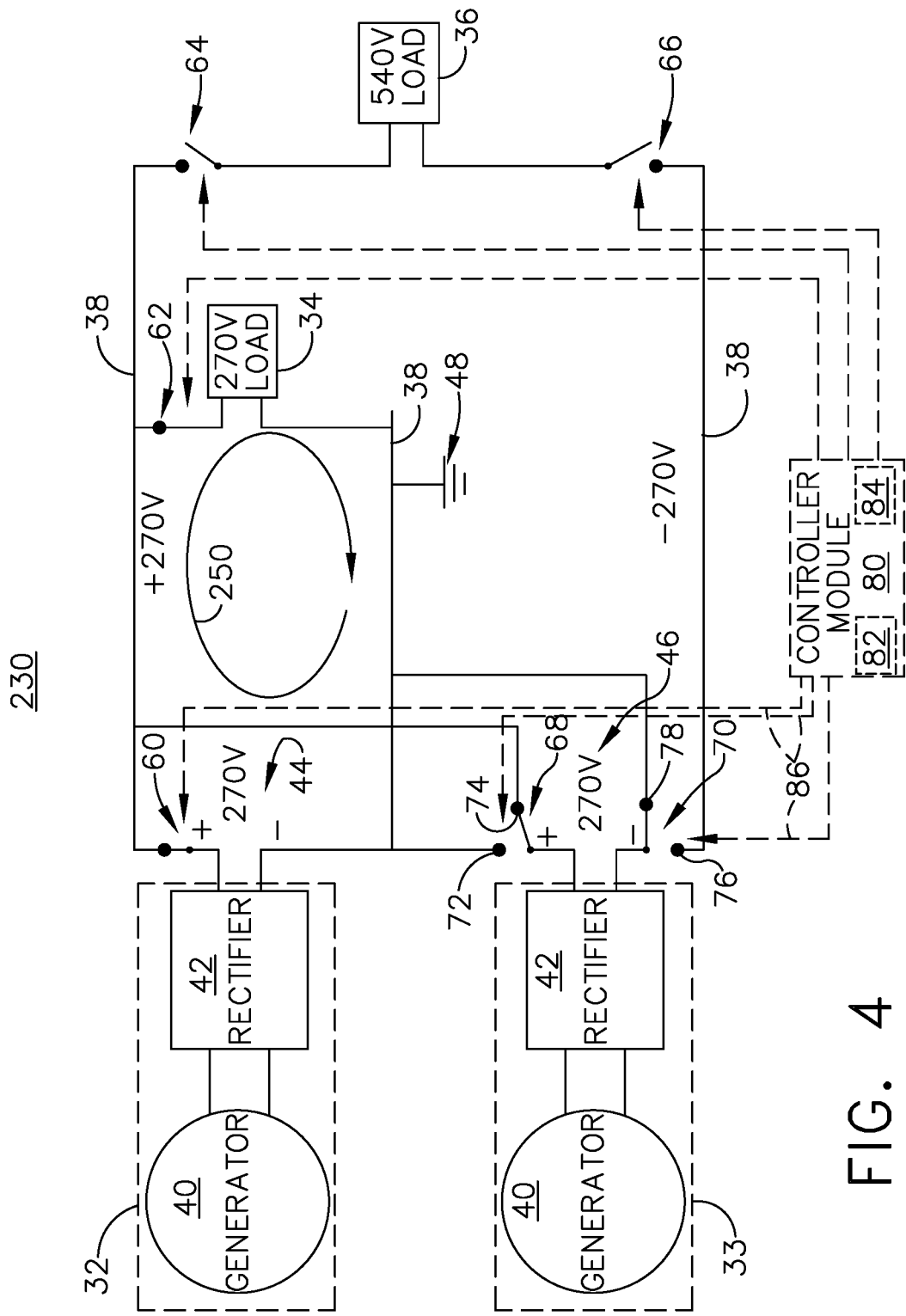
FIG. 4 is a schematic view of a power distribution system of FIG. 2 supplying power to the first current loop, in accordance with various aspects described herein.

FIG. 4 illustrates another configuration or operation of the power distribution system 230 according to another aspect of the present disclosure. The power distribution system 230 is similar to the power distribution system 30, 130; therefore, like parts will be identified with like numerals increased by 200, with it being understood that the description of the like parts of the power distribution system 30, 130 applies to the power distribution system 230, unless otherwise noted. As shown, the power distribution system 230 is controllably operated or configured such that the first switch 60 and the second switch 62, are closed, the third switch 64 and the fourth switch 66 are opened, the fifth switch 68 is connected with the second lead 74 and the sixth switch 70 is connected with the fourth lead 78, in response to a set of control signals from the controller module 80. In this illustrated example, the power distribution system 230 is supplying the first and second power outputs 44, 46 (in parallel) to the first current loop 250. In this sense, the first current loop 250 can receive approximately twice the current, compared with operations or configurations where only one of the first or second power outputs 44, 46.

While the above non-limiting example describes the first current loop 250 as receiving approximately twice the current, aspects of the disclosure can be further included wherein a standard amount of current is supplied to, for example, the first current loop 250, regardless of the number of generator systems 32, 33 or power outputs 44, 46 supplying the first current loop 250. Stated another way, instead of supplying twice the current, non-limiting aspects of the disclosure can be included wherein each generator system 32, 32 can selectably supply a subset (e.g. half) of the current for the first current loop 250.

Figure 5:
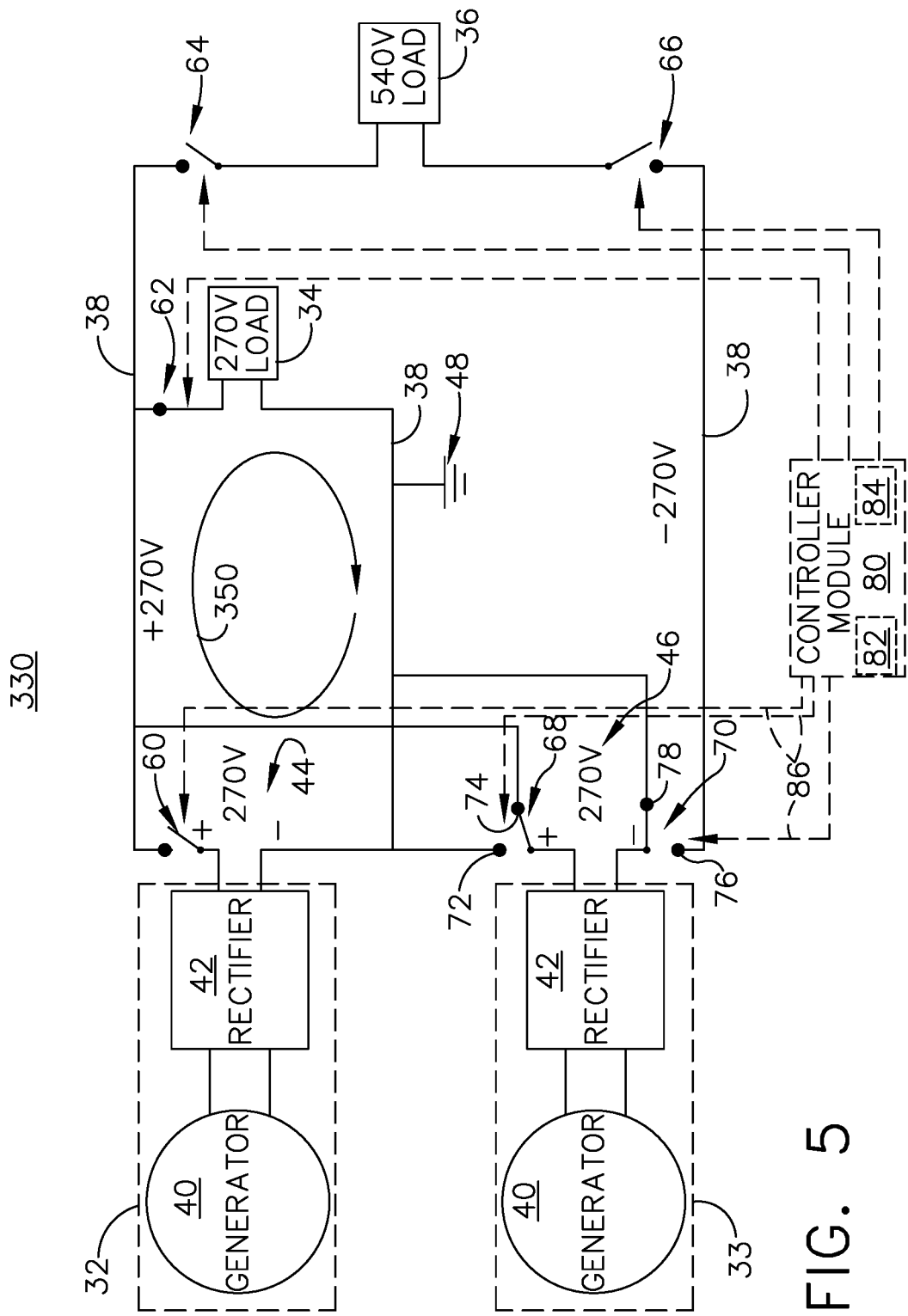
FIG. 5 is another schematic view of a power distribution system of FIG. 2 supplying power to the first current loop, in accordance with various aspects described herein.

FIG. 5 illustrates another configuration or operation of the power distribution system 330 according to another aspect of the present disclosure. The power distribution system 330 is similar to the power distribution system 30, 130, 230; therefore, like parts will be identified with like numerals increased by 300, with it being understood that the description of the like parts of the power distribution system 30, 130, 230 applies to the power distribution system 330, unless otherwise noted. As shown, the power distribution system 330 is controllably operated or configured such that the second switch 62 is closed, the first switch 60, the third switch 64 and the fourth switch 66 are opened, the fifth switch 68 is connected with the second lead 74 and the sixth switch 70 is connected with the fourth lead 78, in response to a set of control signals from the controller module 80. In this illustrated example, the power distribution system 330 is supplying the second power output 46 to the first current loop 350. In this sense, the first power output 44 is disabled, such as if the first generator system 32 has failed or is not operating as expected. In this configuration, the second generator system 33 or the second power output 46 can provide redundant or back up power to the first current loop 350.

Figure 6:
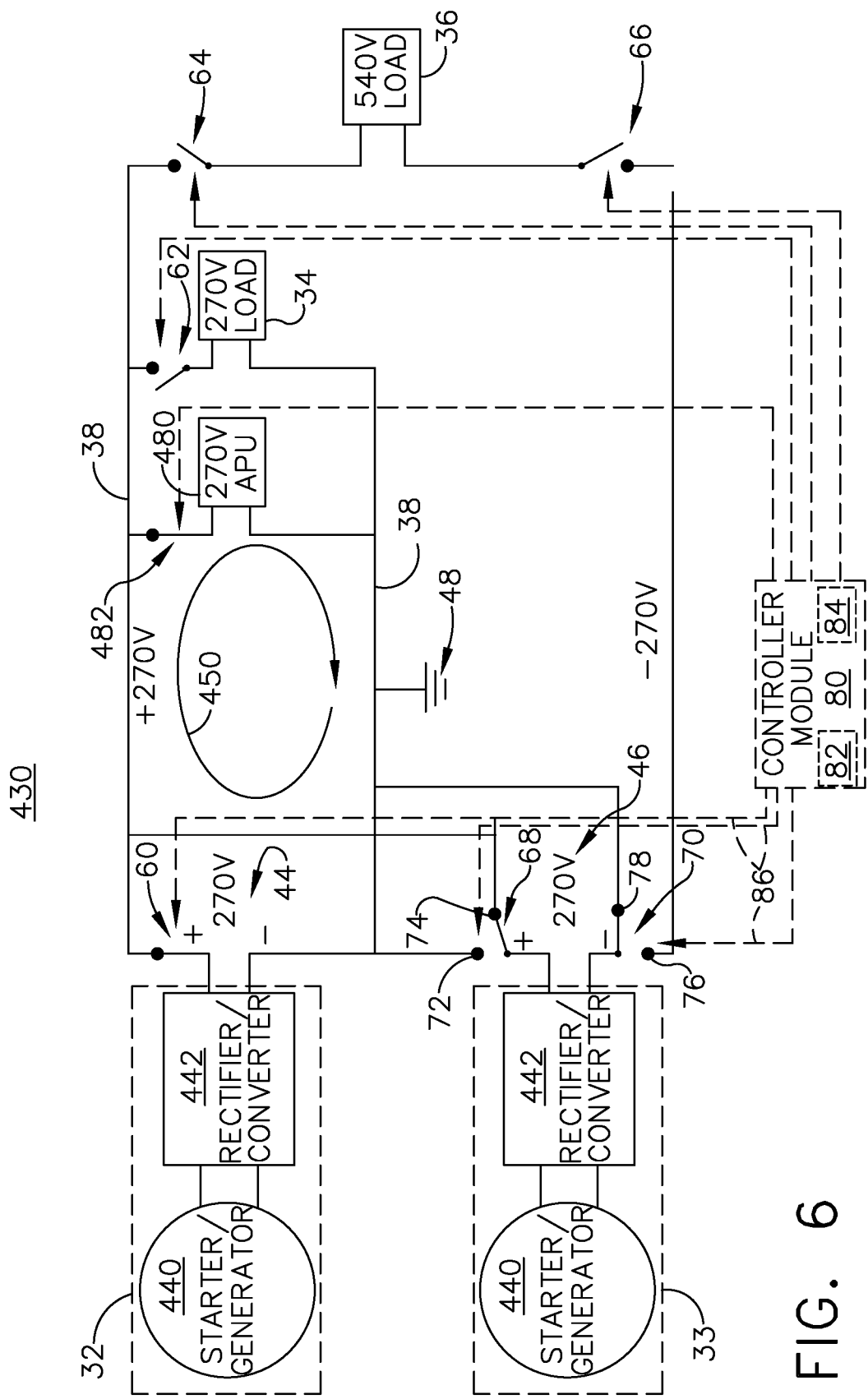
FIG. 6 is a schematic view of a power distribution system of FIG. 2 supplying power to the first current loop to start and auxiliary power unit, in accordance with various aspects described herein.

FIG. 6 illustrates another configuration or operation of the power distribution system 430 according to another aspect of the present disclosure. The power distribution system 430 is similar to the power distribution system 30, 130, 230, 330; therefore, like parts will be identified with like numerals increased by 400, with it being understood that the description of the like parts of the power distribution system 30, 130, 230, 330 applies to the power distribution system 430, unless otherwise noted. As shown, the power distribution system 430 includes low voltage auxiliary power unit (APU) 480, and the first and second generator systems 32, 33 can include starter/generators 440 and rectifier/converters 442, configured in parallel with the first load 34 and selectively connected with the transmission lines by way of a seventh switch 482 the can operably be opened or closed in response to a control signal from the controller module 80. Collectively, aspects of the disclosure can be included wherein the APU 480 can be used to start the engine by way of the respective rectifier/converter 442 and starter/generators 440

In this non-limiting example, the power distribution system 430 is controllably operated or configured such that the first switch 60 and seventh switch are closed, the second switch 62, the third switch 64 and the fourth switch 66 are opened, the fifth switch 68 is connected with the second lead 74 and the sixth switch 70 is connected with the fourth lead 78, in response to a set of control signals from the controller module 80. In this illustrated example the APU 480 acts as a power source for the two parallel starter/generators 440, enabling engine start from a 270 Volt DC APU 480.

Many other possible aspects and configurations in addition to that shown in the above figures are contemplated by the present disclosure. For example, further non-limiting aspects of the disclosure can be included, wherein a first power distribution system can be operably configured, arranged, controlled, or the like, to provide supplemental or redundant power outputs or power supplies to a second power distribution system. Additionally, non-limiting aspects of the disclosure can be included wherein any number of power generator systems can be included (e.g. three generator systems, four generator systems, five generator systems, etc.) in the power distribution system to provide supplemental or redundant power outputs or power supplies, as needed or desired. Additionally, the design and placement of the various components can be rearranged such that a number of different in-line configurations could be realized.

The aspects disclosed herein provide a method and apparatus for a power distribution system configured or adapted for distributing power from a power source to a set of electrical loads by way of a controllable set of switches. As load power on aircraft increases, higher voltages can be utilized to power those loads. One advantage that can be realized in the above aspects is that the tailoring to the particularized power distribution needs can reduce the number of unnecessary or redundant power distribution components, while providing a comparably level of power distribution characteristics or redundancies. Additionally the positive and negative 270 Volt DC power systems can be combined to make 540 Volt DC power available for higher power consuming electrical loads, such as hybrid system that, for example, provide takeoff and climb assist for an aircraft, or direct energy systems.

Aspects of the disclosure can further allow for the high voltage power (e.g. 540 Volt DC power) while ensuring the maximum voltage to electrical ground or the aircraft fuselage is 270 Volts DC. By ensuring the maximum voltage to electrical ground remains less than the high voltage power, aspects of the disclosure minimizes or reduces arc to ground fault risks. Another advantage of the above described aspects is that the power distribution system allows for reconfiguration in flight or in process to enable redundancies in power supply to a set of electrical loads, such as flight critical or emergency loads.

Yet another advantage of the above described aspects is that when the high voltage load (e.g. 540 Volts DC) is only used during a limited portion of the aircraft mission (such as takeoff and climb), the set of generator systems or power outputs are configured or enabled in a parallel configuration to supply power to the low voltage (e.g. 270 Volts DC) common set of loads, the power out of each generator system is or can be reduced while supplying the same amount of power for the set of loads. Reducing the power out of each generator system can result in the generator systems running "cooler" (e.g. at a lower temperature, or with fewer thermal considerations to account for), which can extend the life of the generator system by reducing thermal or thermal cycling effects or fatigue.

When designing aircraft components, important factors to address are size, weight, and reliability. The above described power distribution system results in a lower weight, smaller sized, increased performance, and increased reliability system. The lower number of parts and reduced maintenance will lead to a lower product costs and lower operating costs. Reduced weight and size correlate to competitive advantages during flight.

To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution system, comprising:
   a first generator system adapted to generate a first power;
   a first set of electrical loads selectively connectable with a first current loop;
   a second generator system adapted to generate a second power;
   a second set of electrical loads selectively connectable with a second current loop; and
   a controller module configured to selectively connect the respective power outputs to at least one of the first or second current loops;
   wherein, in response to a control signal from the controller module, the first generator system is selectively connectable with the first current loop, the second generator system is selectively connectable with the first current loop, and the first and second generator systems are selectively connectable in series with second current loop.

2. The power distribution system of claim 1, wherein the first power is a positive voltage power, relative to electrical ground and the second power is a negative voltage relative to electrical ground.

3. The power distribution system of claim 1 wherein the first set of electrical loads are adapted to be powered by at least one of the first power, the second power, or a parallel arrangement of the first power and the second power.

4. The power distribution system of claim 1 further including a set of switchable elements are controllably operatable by the controller module and arranged to selectively connect the at least one of the first generator system or the second generator system with at least one of the first current loop or the second current loop.

5. The power distribution system of claim 1 wherein the second set of electrical loads are adapted to be powered by the series combination of the first power and the second power.

6. The power distribution system of claim 1 wherein the first power can be selectably suppliable to the first current loop and the second current loop simultaneously.

7. The power distribution system of claim 6 wherein the second power is selectably suppliable to one of the first current loop or the second current loop.

8. The power distribution system of claim 1 wherein the first generator system is adapted to generate a first power of positive 270 Volts direct current (DC) and the second generator system is adapted to generate a second power of negative 270 Volts DC.

9. The power distribution system of claim 1 wherein the second generator system is selectively connectable with the first current loop to provide a redundant second power to the first current loop.

10. The power distribution system of claim 1 wherein at least a portion of the first current loop overlaps with at least a portion of the second current loop.

11. A power distribution system, comprising:
    a first current loop connectable with a set of low voltage electrical loads;
    a second current loop connectable with a set of high voltage electrical loads;
    at least two generator systems having respective power outputs; and
    a controller module configured to selectively connect the respective power outputs to at least one of the first or second current loops;
    wherein, in response to a control signal from the controller module, at least one of the first or second generator systems power outputs is connectable with the first current loop to supply power to the low voltage electrical loads, or the first and second generator system power outputs are connectable in series and are further connectable with the second current loop to supply power to the high voltage electrical loads.

12. The power distribution system of claim 11 wherein, in response to the control signal from the controller module, the first and second generator systems power outputs can simultaneously connect in parallel with the first current loop to simultaneously supply power to the low voltage electrical loads.

13. The power distribution system of claim 11 wherein the set of high voltage electrical loads provide takeoff or climb assist for an aircraft.

14. The power distribution system of claim 11 wherein the at least two generator systems are similar generator systems.

15. The power distribution system of claim 11 wherein the at least two generator systems provide similar power outputs.

16. The power distribution system of claim 11 further including a set of switchable elements communicatively connectable with the controller module and, in response to control signals from the controller module, selectively connect the at least two generator system power outputs with at least one of the first current loop or the second current loop.

17. The power distribution system of claim 11, wherein the first power output is a positive voltage power output relative to electrical ground and the second power output is a negative voltage output relative to electrical ground.

18. The power distribution system of claim 11 wherein a first generator system is adapted to generate a first power of positive 270 Volts direct current (DC) and a second generator system is adapted to generate a second power of negative 270 Volts DC.

19. The power distribution system of claim 1 wherein at least a portion of the first current loop overlaps with at least a portion of the second current loop.

* * * * *